United States Patent Office 3,163,626
Patented Dec. 29, 1964

3,163,626
CURING HALOGENATED ISOOLEFIN-MULTI-
OLEFIN COPOLYMERS
Leon S. Minckler, Jr., Metuchen, and Delmer L. Cottle,
Highland Park, N.J., assignors to Esso Research and
Engineering Company, a corporation of Delaware
No Drawing. Filed Apr. 14, 1961, Ser. No. 102,917
15 Claims. (Cl. 260—85.3)

The present invention relates to improved vulcanization recipes for halogenated rubbery polymers. More particularly, it deals with curing halogenated isoolefin-multiolefin copoylymers, e.g., halogenated butyl rubber, at an accelerated rate by the use of diamine-ol (hydroxy diamines) compounds as curatives.

Copolymers of the above general class, particularly where the copolymers contain about 85 to 99.5 wt. percent of a $C_4$ to $C_8$ isoolefin, e.g., isobutylene, 3-methyl butene-1, with about 15 to 0.5 wt. percent of a multiolefin of about 4 to 14 carbon atoms, e.g., myrcene, isoprene, butadiene, etc., are well known in the literature as "butyl rubber." For example, see "Synthetic Rubber" by G. S. Whitby (1954) and U.S. Patent 2,356,128, among many others. Halogenated butyl rubber-type copolymers are produced by halogenating butyl rubber in a manner which does not substantially degrade its molecular weight but, however, gives a rubbery product of substantially different properties than the unhalogenated material. Butyl rubber may be halogenated at temperatures of −50° to 200° C., preferably 0° to 100° C., at pressures of 0.5 to 900 p.s.i.a. with suitable halogenating agents such as gaseous chlorine, liquid bromine, iodine monochloride, etc. Halogenation may be accomplished in various ways. For example, the halogenation agent, e.g., chlorine, may be added to a solution of the copolymer in a suitable inert liquid organic solvent. The resulting halogenated polymer may be recovered by precipitation with a nonsolvent at about 0° to 180° C., spray drying, or by flashing off the hydrocarbon solvent by injection into a hot water bath.

Preferably, the degree of halogenation is carefully regulated so that the halogenated copolymer contains at least 0.5 wt. percent of combined halogen, but not more than about one atom of combined fluorine or chlorine per double bond in the polymer, nor more than three atoms of combined bromine or iodine per double bond. A more detailed description of the formation of chlorinated butyl rubber may be had by referring to co-assigned Serial No. 512,182, filed May 31, 1955 now U.S. Patent No. 2,944,578, patented July 12, 1960, to Baldwin, et al.

The halogenated copolymer has a viscosity average molecular weight of about 100,000 to 2,000,000 and a mole percent unsaturation of between 0.1 to 20, preferably less than 10. As hereinafter employed in the specification, the term "halogenated butyl rubber" denotes the above described halogenated copolymers of a major portion of a $C_4$ to $C_8$ isoolefin and a minor portion of a $C_4$ to $C_{14}$ multiolefin.

Due to the relatively saturated nature of halogenated butyl rubber, one of the difficulties presented in its utilization has been its relatively low cure rate as compared with high unsaturation rubbers such as natural rubber. Relatively fast cures are desired in various application for rubbery copolymers such as extrusion of tubes, conveyor belting, and wire coatings.

It has now been found that halogenated butyl rubber can be cured in a relatively short period of time to give vulcanizates of good physical properties by employing minor portions (based on rubbery polymer) of diamine-ol compounds. Not only is the cure time reduced through the use of diamine-ols as curatives, but additionally it has been found that the hydroxydiamines give vulcanizates of improved physical properties when employed for relatively long curing periods, e.g., 45 minutes.

Curing may be effected under a broad range of temperatures, e.g., 200° to 450° F., preferably 250° to 350° F., as well as under various conditions, e.g., open steam heating, oven curing, during extrusion or molding, etc. The curing period may vary from about 2 minutes to several hours, it preferably being between about 5 to 60 minutes, depending on temperature. Normally about 0.1 to 20, preferably 0.5 to 10, and particularly 1 to 8, wt. percent based on halogenated polymer of a diamine-ol compound is employed in the curing recipe. The hydroxydiamine compound may be used as the sole curing agent. However, it may be employed in conjunction with 1 to 10 wt. percent based on polymer of metallic oxides such as zinc oxide, stannous oxide, magnesium oxide, etc. Such combinations of ingredients are particularly effective in obtaining fast, tight cures. In general, the presence of elemental sulfur as a curing agent is neither necessary nor desirable in the compositions of the present invention. Although a less desirable embodiment of the present invention, very small amounts, e.g., 0.1 to 1 wt. percent, of diamine-ols may be used as vulcanization accelerators for conventional cure systems as opposed to being a prime curing agent itself.

Vulcanization recipes prepared in accordance with the present invention may contain various additional materials such as carbon black, mineral fillers, pigments, antioxidants, extender oils, antitack agents, etc. If desired, blends of halogenated butyl and other rubbers, e.g., natural rubber, neoprene, butadiene-styrene polymers, etc., may be cured with the diamine-ol compounds of the present invention.

It is noted that although recently it has been suggested that various amine compounds may be used as curing agents for halogenated butyl rubber, it has been found that the diamine-ol compounds of the present invention will give particularly fast cures, whereas simply employing amines or even monoamine-ols is not effective in yielding this very desirable result.

Diamine-ol compounds suitable for the practice of the present invention may be represented by the following generic formulae:

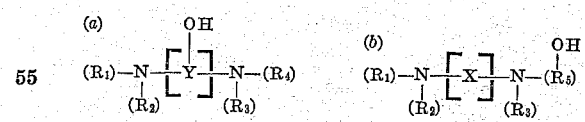

wherein Y is selected from the group consisting of $C_3$ to $C_{20}$ alkylene, arylene, aralkylene, and alkarylene; X is selected from the group consisting of $C_2$ to $C_{20}$ alkylene, arylene, aralkylene, and alkarylene; $R_1$, $R_2$, $R_3$, and $R_4$ are each selected from the group consisting of hydrogen, $C_1$ to $C_{10}$ alkyl, aryl, aralkyl, and alkaryl; $R_5$ is selected from the group consisting of $C_1$ to $C_{10}$ alkylene, arylene, aralkylene, and alkarylene; and $R_2$ and $R_3$ in the same molecule may be jointly alkylene, the hydroxyl group being attached to a carbon atom other than one directly attached to a nitrogen atom.

Examples of suitable compounds are the following:

2,4-diaminophenol dihydrochloride;
2(2-aminoethylamino)ethanol;
p,p'[(p-hydroxybenzylidene-bis(N,N-dimethylaniline)];
1,4-bis(2-hydroxypropyl)-2-methyl piperazine;
1,3-bis(dimethylamino)-2-propanol;
1,5-diamino-3-pentanol;
1,5-bis(diethylamino)-2-pentanol;
4(2-methylamino-1-hydroxyethyl)cyclohexylamine;
2-(p-hydroxyphenyl)-1,3-bis(butylamino)propane;
3,5-diamino cyclohexanol;
p-(2-ethylaminoethylamino)phenol;
2(2-aminopropylamino)cyclohexanol;
2-aminomethyl-4-dimethylamino-1-naphthol;
2-hydroxymethyl piperazine; and
1,3-bis(octylamino)-2-propanol.

The term "diamine-ol compound" as employed in this specification denotes compounds containing at least 2 nitrogen atoms and 1 hydroxy group, and conforming to the above generic structural formulae.

The various aspects and modifications of the present invention will be made more clearly apparent by reference to the following description and accompanying examples.

In the following examples, two typical halogenated butyl rubber polymers, hereinafter denoted as "chlorinated butyl rubber A" and "brominated butyl rubber B," were employed. The halogenated butyl rubber polymers are characterized in Table I.

TABLE I

|  | Chlorinated Butyl Rubber A | Brominated Butyl Rubber B |
| --- | --- | --- |
| Weight Percent Isobutylene | 96.73 | 95.75. |
| Wt. Percent Isoprene | 1.97 | 1.95. |
| Wt. Percent Halogen | 1.3 (chlorine) | 2.3 (bromine). |
| Mole Percent Unsaturation | 0.8 | 0.7. |
| Viscosity Average Molecular Weight | 375,000 | 400,000. |

*Examples 1 Through 4*

Chlorinated butyl rubber A was compounded in the manner indicated in Table II. The various ingredients were mixed on a rubber mill in the conventional manner. The proportions of components are shown in parts by weight. Portions of the recipes were then vulcanized for 15 and 45 minutes, respectively, at a temperature level of 307° F. The vulcanizates had the properties indicated.

TABLE II

| Compound | 1 | 2 | 3 | 4 |
| --- | --- | --- | --- | --- |
| Chlorinated Butyl Rubber A | 100 | 100 | 100 | 100 |
| Carbon Black (Philblack-O) | 50 | 50 | 50 | 50 |
| Stearic Acid | 1 | 1 | 1 | 1 |
| Zinc Oxide | 5 | | | |
| 2(2-aminoethylamino)ethanol | | 2.5 | | |
| m-Dimethylaminophenol | | | 5 | |
| 2-amino-2-methyl-1-propanol | | | | 3 |
| Cured 15' at 307° F.: | | | | |
| Mod., p.s.i./300% | 550 | 650 | 450 | 260 |
| Tensile, p.s.i. | 1,050 | 1,440 | 1,040 | 410 |
| Elongation, percent | 620 | 575 | 740 | 800 |
| Cured 45' at 307° F.: | | | | |
| Mod., p.s.i./300% | 1,285 | 1,325 | 990 | 465 |
| Tensile, p.s.i. | 1,635 | 2,190 | 1,765 | 985 |
| Elongation, percent | 385 | 425 | 485 | 610 |
| Goodrich Flexometer, 45' at 307° F.: | | | | |
| Dynamic Drift, Percent | | 0.3 | 4.9 | |
| Final Dynamic Comp., Percent | failed | 8.4 | 32.6 | failed |
| Comp. Set, Percent | | 12.3 | 4.9 | |
| Max. Temp. Rise, ° C | | 32 | 42 | |
| To Max. Temp., Min | | 12 | 8 | |

As shown in Table II, the use of a diamine-ol (Compound 2) gave a vulcanizate of substantially better physical and dynamic properties than was obtained by the use of a conventional zinc oxide cure (Compound 1), or through the use of monoamine-ol compounds (Compounds 3 and 4). Vulcanizates having cure rates and tensile strengths approximately 400 p.s.i. greater than that obtained by the use of other curatives were secured, while simultaneously obtaining a vulcanized product of improved dynamic properties.

*Examples 5 Through 9*

Brominated butyl rubber B was compounded with the ingredients shown in Table III in a manner similar to that described in Examples 1 through 4. The proportions of ingredients are shown in parts by weight. The recipes were thereafter vulcanized and the physical properties of the resulting vulcanizates compared.

TABLE III

| Compound | 5 | 6 | 7 | 8 | 9 |
| --- | --- | --- | --- | --- | --- |
| Brominated Butyl Rubber B | 100 | 100 | 100 | 100 | 100 |
| Carbon Black (Philblack-O) | 50 | 50 | 50 | 50 | 50 |
| Stearic Acid | 1 | 1 | 1 | 1 | 1 |
| Zinc Oxide | 5 | | | | |
| 2(2-aminoethylamino)ethanol | | 2.5 | | | |
| p,p'[p-hydroxybenzylidene-bis-(N,N-dimethylaniline)] | | | 5 | | |
| 1,4-bis(2-hydroxypropyl)2-methyl-piperazine | | | | 5 | |
| 2-amino-2-methyl-1-propanol | | | | | 3 |
| Cured 15' at 307° F.: | | | | | |
| Mod., p.s.i./300% | 1,450 | 1,890 | 1,815 | 1,980 | 1,225 |
| Tensile, p.s.i. | 2,205 | 2,585 | 2,305 | 2,715 | 1,870 |
| Elongation, Percent | 420 | 380 | 415 | 390 | 515 |
| Cured 45' at 307° F.: | | | | | |
| Mod., p.s.i./300% | 1,500 | 2,085 | 2,145 | 2,160 | 1,650 |
| Tensile, p.s.i. | 2,035 | 2,365 | 2,225 | 2,455 | 1,880 |
| Elongation, Percent | 385 | 325 | 330 | 340 | 365 |
| Goodrich Flexometer, 45' at 307° F.: | | | | | |
| Dynamic Drift, Percent | 4.8 | −0.5 | | 0.2 | |
| Final Dynamic Comp., Percent | 11.3 | −5.0 | | 2.8 | |
| Comp. Set, Percent | 5.5 | 0.4 | | 1.6 | |
| Max. Temp. Rise, ° C | 34 | 15 | | 21 | |
| To Max. Temp., Min | 28 | 22 | | 16 | |

As shown in Table III, the use of diamine-ols as curatives (Compounds 6, 7 and 8) gave vulcanizates having substantially better tensile and dynamic properties than were obtained by the use of either a zinc oxide (Compound 5) or a monoamine-ol (Compound 9) cure system. In general, the diamine-ol curing systems give faster cure rates as indicated by improved modulus.

*Example 10*

Brominated butyl rubber B was compounded as indicated in Table IV. The resulting recipe was then subjected to vulcanization for the time and temperatures indicated, and the resulting vulcanizate evaluated.

TABLE IV

| Formulation (parts by weight) | Example |
| --- | --- |
| Brominated Butyl Rubber B | 100 |
| Carbon Black (Philblack-O) | 50 |
| Stearic Acid | 1 |
| Zinc Oxide | |
| 1,3-bis(dimethylamino)-2-propanol | 5 |
| Cured 15' at 307° F.: | Compound 10 |
| Modulus, p.s.i./300% | 2,430 |
| Tensile, p.s.i. | 3,040 |
| Elongation, percent | 385 |
| Cured 45' at 307° F.: | |
| Modulus, p.s.i./300% | 1,820 |
| Tensile, p.s.i. | 2,470 |
| Elongation, percent | 410 |

As shown in Table IV, the use of 1,3-bis(dimethylamino)-2-propanol as a curative gave vulcanizates of excellent properties, particularly outstanding for a 15 minute cure. The vulcanizate has substantially better physical properties than did a conventional zinc oxide cure (Compound 5 in Table III).

Examples 11 and 12

Brominated butyl rubber B was compounded in the manner indicated in Table V, and the resulting recipes cured at 307° F. for the periods indicated. The compounds were distinguished by the additional presence of a metal oxide (magnesium oxide) together with a di-amine-ol curative.

TABLE V

| Compound | 11 | 12 |
|---|---|---|
| Brominated Butyl Rubber B | 100 | 100 |
| Carbon Black (Philblack-O) | 50 | 50 |
| Stearic Acid | 1 | 1 |
| Magnesium Oxide | | 2 |
| 2,4-diaminophenol dihydrochloride | 3 | 3 |
| Cured 15' at 307° F.: | | |
| Modulus, p.s.i./300% | 825 | 1,285 |
| Tensile, p.s.i. | 1,255 | 1,845 |
| Elongation, percent | 525 | 390 |
| Cured 45' at 307° F.: | | |
| Modulus, p.s.i./300% | 850 | 1,465 |
| Tensile, p.s.i. | 1,285 | 1,930 |
| Elongation, percent | 535 | 360 |

As shown above, the use of a metal oxide in combination with a diamine-ol curative gives improved results. Vulcanizates of substantially better tensile properties may thus be obtained.

Various modifications may be made while employing the compounding ingredients of the present invention. For example, mixed diamine-ol systems may be used. They may also be used in combination with other accelerators or curing agents as noted previously.

Having described the present invention, that which is sought to be protected is set forth in the following claims.

What is claimed is:

1. A composition comprising a halogenated rubbery copolymer having a viscosity average molecular weight of above 100,000 and prepared by copolymerizing a feed stock having a major proportion of a $C_4$ to $C_8$ isoolefin and a minor proportion of a $C_4$ to $C_{14}$ multiolefin, said copolymer containing at least about 0.5 wt. % halogen but no more than about three combined atoms of halogen per double bond in the copolymer, and a minor proportion of a diamine-ol compound selected from the group consisting of:

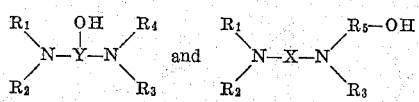

wherein Y is selected from the group consisting of $C_3$ to $C_{20}$ alkylene, arylene, aralkylene, and alkarylene; X is selected from the group consisting of $C_2$ to $C_{20}$ alkylene, arylene, aralkylene, and alkarylene; $R_1$, $R_2$, $R_3$, and $R_4$ are each selected from the group consisting of hydrogen, $C_1$ to $C_{10}$ alkyl, aryl, aralkyl, and alkaryl; $R_5$ is selected from the group consisting of $C_1$ to $C_{10}$ alkylene, arylene, aralkylene, and alkarylene; and $R_2$ and $R_3$ in the same molecule may be jointly alkylene; the hydroxyl group being attached to a carbon atom other than one directly attached to a nitrogen atom.

2. The composition of claim 1 wherein said diamine-ol compound comprises 0.5 to 10 wt. % based on copolymer of said composition.

3. A composition comprising a halogenated rubbery copolymer of about 85 to 99.5 wt. % of a $C_4$ to $C_8$ isoolefin and about 15 to 0.5 wt. % of a $C_4$ to $C_{14}$ multiolefin, said copolymer containing at least 0.5 wt. % halogen but no more than 3 atoms of combined halogen per double bond in the copolymer, and 0.1 to 20 wt. % based on copolymer of a diamine-ol compound from the group consisting of:

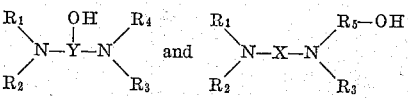

wherein Y is selected from the group consisting of $C_3$ to $C_{20}$ alkylene, arylene, aralkylene, and alkarylene; X is selected from the group consisting of $C_2$ to $C_{20}$ alkylene, arylene, aralkylene, and alkarylene; $R_1$, $R_2$, $R_3$, and $R_4$ are each selected from the group consisting of hydrogen, $C_1$ to $C_{10}$ alkyl, aryl, aralkyl, and alkaryl; $R_5$ is selected from the group consisting of $C_1$ to $C_{10}$ alkylene, arylene, aralkylene, and alkarylene; and $R_2$ and $R_3$ in the same molecule may be jointly alkylene; the hydroxyl group being attached to a carbon atom other than one directly attached to a nitrogen atom.

4. The composition of claim 3 wherein said copolymer contains a halogen selected from the group consisting of chlorine and bromine.

5. The composition of claim 3 wherein said diamine-ol compound is 2(2-aminoethylamino)ethanol.

6. The composition of claim 3 wherein said diamine-ol compound is 2,4-diaminophenol dihydrochloride.

7. The composition of claim 3 wherein said diamine-ol compound is p,p′[p-hydroxybenzylidene-bis(N,N-dimethylaniline)].

8. The composition of claim 3 wherein said diamine-ol compound is 1,4-bis(2-hydroxypropyl)-2-methylpiperazine.

9. The composition of claim 3 wherein said diamine-ol compound is 1,3-bis(dimethylamino)-2-propanol.

10. The process of curing a halogenated copolymer of a major proportion of a $C_4$ to $C_8$ isoolefin and a minor proportion of a $C_4$ to $C_{14}$ multiolefin which comprises, admixing said copolymer with from 0.1 to 20 wt. % based on copolymer of a diamine-ol compound selected from the group consisting of:

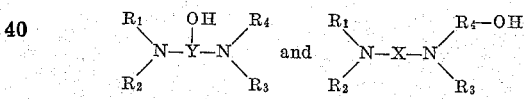

wherein Y is selected from the group consisting of $C_3$ to $C_{20}$ alkylene, arylene, aralkylene, and alkarylene; X is selected from the group consisting of $C_2$ to $C_{20}$ alkylene, arylene, aralkylene, and alkarylene; $R_1$, $R_2$, $R_3$, and $R_4$ are each selected from the group consisting of hydrogen, $C_1$ to $C_{10}$ alkyl, aryl, aralkyl, and alkaryl; $R_5$ is selected from the group consisting of $C_1$ to $C_{10}$ alkylene, arylene, aralkylene, and alkarylene; and $R_2$ and $R_3$ in the same molecule may be jointly alkylene; the hydroxyl group being attached to a carbon atom other than one directly attached to a nitrogen atom and subjecting said admixture to a temperature in the range of 200° F. to 400° F. so as to cure said copolymer.

11. The process of claim 10 wherein 0.5 to 10 wt. % base on copolymer of said diamine-ol compound is employed.

12. The composition of claim 3 which contains additionally based on the copolymer from 1 to 10 wt. % of a metal oxide.

13. The process of claim 10 wherein the said diamine-ol compound is the sole curative for said copolymer.

14. The process of claim 10 wherein the curing of the halogenated copolymer takes place in the presence of from 1 to 10 wt. % of a metal oxide.

15. The vulcanizate produced by the process of claim 10.

References Cited in the file of this patent
UNITED STATES PATENTS

| | | |
|---|---|---|
| 2,864,775 | Newey | Dec. 16, 1958 |
| 2,864,489 | Baldwin et al. | Dec. 13, 1960 |
| 2,984,642 | Minckler et al. | May 16, 1961 |